(No Model.)

J. M. BROOKS.
TURPENTINE STILL.

No. 547,202. Patented Oct. 1, 1895.

Witnesses
Inventor
James M. Brooks
By Alexander Davis
Attorneys

UNITED STATES PATENT OFFICE.

JAMES M. BROOKS, OF MOLENA, GEORGIA.

TURPENTINE-STILL.

SPECIFICATION forming part of Letters Patent No. 547,202, dated October 1, 1895.

Application filed January 30, 1895. Serial No. 536,686. (No model.)

*To all whom it may concern:*

Be it known that I, JAMES M. BROOKS, a citizen of the United States, residing at Molena, in the county of Pike and State of Georgia, have invented certain new and useful Improvements in Turpentine-Stills, of which the following is a specification, reference being had therein to the accompanying drawings, in which—

Figure 1:
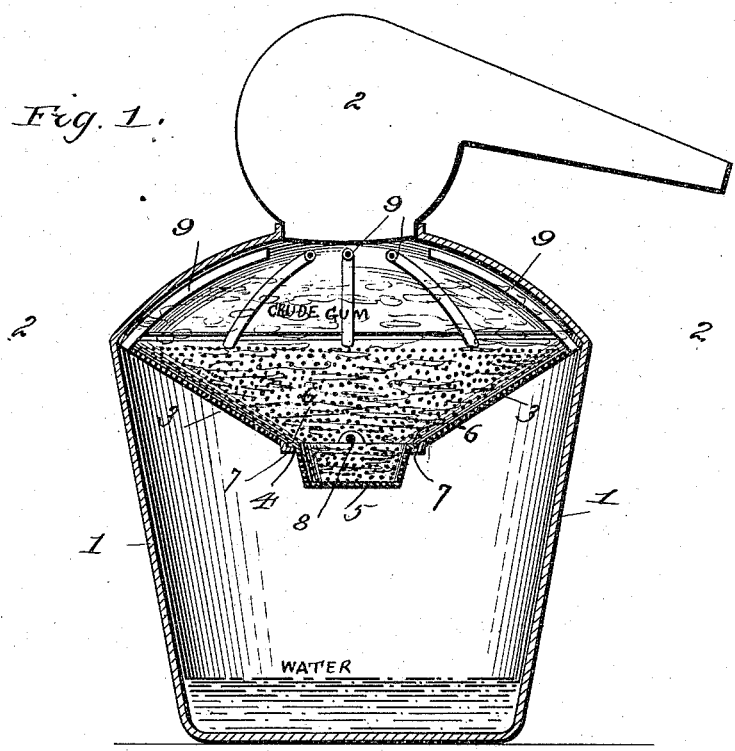
Figure 2:
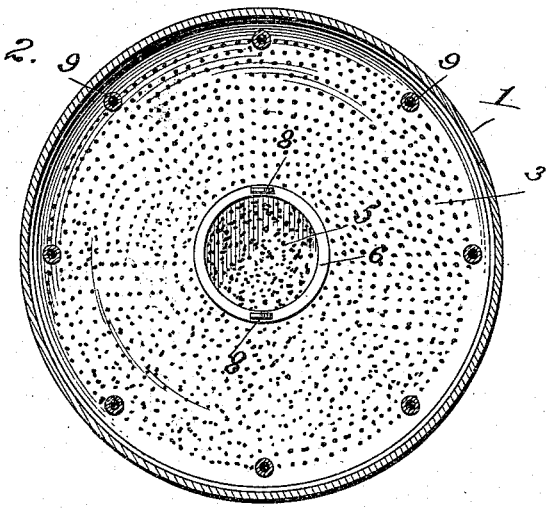
Figure 3:
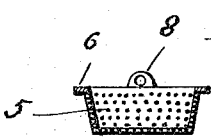

Figure 1 is a vertical sectional view of a still with the improvements attached. Fig. 2 is a horizontal sectional view thereof on line 2 2 of Fig. 1, and Fig. 3 a detail of the removable basket or pan.

This invention relates to a new and improved turpentine still; and it has for its objects to provide a device of simple construction which may be applied directly to the usual stills, and by means of which all foreign substances—such as chips, pieces of bark, &c.—will be extracted from the crude gum and will not be permitted to pass into the rosin, whereby a superior quality of rosin is produced which will be free from discoloration and impurities.

The invention consists in the novel combination and arrangement of parts hereinafter described, and particularly pointed out in the claims appended.

Referring to the various parts by numerals, 1 designates a still of any usual or preferred construction, that shown in the drawings being of circular form, having a convex top; 2, a dome or cap therefor of the usual construction, its lower end opening into the still at its upper end, as shown.

Secured within the still, at the lower edge of the convex top thereof, is a finely-perforated circular partition or screen 3. This screen is formed of any suitable material, preferably of perforated sheet metal, and is in the form of an inverted truncated cone, its sides or bottom extending inwardly and downwardly, as shown. This partition divides the still into an upper and lower chamber, as shown. An opening 4 of suitable size is formed in the center of this screen at its lower end, said opening being closed by a removable pan or basket 5, formed of finely-perforated sheet metal or other suitable material, said pan closely fitting within the opening 4, as shown. Around the upper edge of the pan 5 is formed an outwardly-extending annular flange 6, which when the pan is in position rests on an inwardly-extending flange 7, formed on the lower end of the screen 3, and supports the pan in position in the opening in the screen. Upwardly-extending perforated lugs 8 8 are formed on the upper edge of the pan to be engaged by hooks or any suitable implement to facilitate the removal of the pan.

In the screen or partition 3, near the point where its upper edge is secured to the sides of the still, the lower ends of small open-ended tubes 9 are inserted, said tubes extending along the under side of the top of the still, their upper ends opening near to the lower open end of the cap 2, for a purpose which will hereinafter appear.

The operation of my device is as follows: A suitable quantity of water is put into the still and the pan 5 placed in position. The upper chamber, formed by the perforated partition 3 and the pan 5, is now charged with a suitable quantity of crude gum, and heat is applied to the still in any suitable way. When the water begins to boil, the steam will melt the gum and the melted gum will drip through the perforations in the partition and pan into the water below. In the meantime the steam and spirits-of-turpentine vapor that accumulate below the partition while it is yet covered with crude gum will pass to the highest part of the chamber below the partition and then escape through the tubes 9 and be led over the mass of gum in the upper chamber to the outlet of the still, and thence into the cap of the still. As the gum melts and passes to the chamber below the partition, the perforations in the highest parts of the partition will be gradually uncovered and the vapors will then pass up through them to the outlet. After all the gum has melted and has passed below the partition, the greater part of the vapor will pass upward through the perforations in the partition into the cap. From the cap the fumes are led off to the condensing-coil in any suitable manner. When all the spirits of turpentine has been extracted from the charge, the cap 2 is removed from the still. The pan or basket 5, which will contain all the refuse, chips, &c., which have been strained out of the gum by the partition and the basket, is then lifted out through the opening in the still and cleaned. The still is then cleaned and recharged for the next operation.

It will thus be seen that I provide an exceedingly simple device by means of which a high grade of rosin will be produced and in which the crude gum is subject to only one handling, thereby effecting a material saving in time and cost of production.

Having thus fully described my invention, what I claim is—

1. The combination of a turpentine still provided with a fume outlet, and a partition dividing said still into an upper and a lower chamber, said partition inclining downwardly to a degree greater than the angle of repose and being perforated at its highest parts whereby when said perforations become free from the gum in the upper chamber the fumes from the lower chamber will escape upwardly through them, substantially as described.

2. A turpentine still comprising a still provided with a fume outlet, a perforated partition dividing the still into an upper and a lower chamber, the sides of said partition inclining downwardly to direct the fumes in the lower chamber to the highest part of said chamber, a tube connecting the highest part of the lower chamber with the fume-outlet, substantially as described and for the purpose set forth.

3. A turpentine still comprising a still provided with a fume outlet, a perforated partition dividing said still into an upper and a lower chamber, said partition inclining from its outer edge downwardly and inwardly to a degree greater than the angle of repose, an opening being formed in its lower end, and a removable perforated pan or basket adapted to close said opening, the inclined sides of the partition causing the refuse to collect in the pan, substantially as described and for the purpose set forth.

In testimony whereof I affix my signature in presence of two witnesses.

JAMES M. BROOKS.

Witnesses:
D. M. WILLIS,
W. J. HARRIS.